United States Patent
Gmirya (10) Patent No.: US 12,281,679 B2
(45) Date of Patent: Apr. 22, 2025

(54) CENTRIFUGAL FORCE ENABLED CLUTCH AND AIRCRAFT

(71) Applicant: Lockheed Martin Corporation, Bethesda, MD (US)

(72) Inventor: Yuriy Gmirya, Woodbridge, CT (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 18/353,664

(22) Filed: Jul. 17, 2023

(65) Prior Publication Data

US 2025/0027542 A1 Jan. 23, 2025

(51) Int. Cl.

| | |
|---|---|
| *F16D 43/18* | (2006.01) |
| *B64C 27/06* | (2006.01) |
| *B64D 41/00* | (2006.01) |
| *F16D 41/07* | (2006.01) |
| *F16D 45/00* | (2006.01) |
| *F16D 41/06* | (2006.01) |
| *F16D 43/14* | (2006.01) |

(52) U.S. Cl.
CPC .............. *F16D 43/18* (2013.01); *B64C 27/06* (2013.01); *B64D 41/00* (2013.01); *F16D 41/07* (2013.01); *F16D 41/076* (2013.01); *F16D 45/00* (2013.01); *F16D 2041/0603* (2013.01); *F16D 2043/145* (2013.01)

(58) Field of Classification Search
CPC .......... F16D 43/04; F16D 43/14; F16D 43/18; F16D 2043/145; F16D 45/00; F16D 41/07; F16D 41/076; F16D 41/08; F16D 41/084

See application file for complete search history.

(56) References Cited

U.S. PATENT DOCUMENTS

| | | | | |
|---|---|---|---|---|
| 2,477,176 A | * | 7/1949 | Gruenberg | F16D 41/07 192/104 B |
| 2,951,570 A | * | 9/1960 | Antrim, Jr. | F16D 45/00 192/63 |
| 10,577,090 B2 | | 3/2020 | Lauder | |
| 10,788,088 B2 | | 9/2020 | Olson et al. | |
| 10,981,660 B2 | | 4/2021 | Mackin | |
| 2006/0231365 A1 | * | 10/2006 | Muramatsu | F16D 41/07 192/41 A |
| 2009/0298646 A1 | * | 12/2009 | Parsons | F16D 41/07 474/171 |
| 2012/0309576 A1 | * | 12/2012 | Kato | F16H 3/725 475/5 |

FOREIGN PATENT DOCUMENTS

JP H06280897 A * 10/1994

* cited by examiner

*Primary Examiner* — Timothy Hannon (74) *Attorney, Agent, or Firm* — Michael Best & Friedrich LLP (57) ABSTRACT

A clutch having an inner ring, an outer ring, a plurality of sprags positioned between the inner ring and the outer ring, and a spring biasing each of the plurality of sprags towards the outer ring. Each of the plurality of sprags are movable between a disengaged position spaced from the inner ring and an engaged position contacting both the inner ring and the outer ring to rotationally unitize the inner ring and the outer ring.

14 Claims, 7 Drawing Sheets

CENTRIFUGAL FORCE ENABLED CLUTCH AND AIRCRAFT

STATEMENT REGARDING FEDERALLY SPONSORED RESEARCH OR DEVELOPMENT

This invention was made with U.S. Government support under Agreement No. W911W6-19-9-0005 awarded by the U.S. Army. The Government has certain rights in the invention.

FIELD OF INVENTION

Embodiments described herein relate to a clutch and, in particular, to a centrifugal force enabled clutch.

BACKGROUND

Known clutches include sprags that are always contact with both an inner ring and an outer ring of the clutch. Known multimode powertrains that offer options to combine auxiliary engines with main engines provide complicated arrangements having many moving parts requiring controlled hydraulic pressure. These powertrains have low reliability and significantly increase weight and cost of the powertrain.

SUMMARY

Embodiments described herein provide a clutch including an inner ring, an outer ring, a plurality of sprags positioned between the inner ring and the outer ring, and a spring biasing each of the plurality of sprags towards the outer ring. According to the rotation of the outer ring and the bias of the spring, each of the plurality of sprags are movable between a disengaged position spaced from the inner ring and the outer ring does not rotate with the inner ring, and an engaged position in which the sprags overcome the bias of the spring and the sprags contact both the inner ring and the outer ring such that the inner ring and the outer ring are rotationally unitized.

Embodiments described herein provide a centrifugal force enabled clutch including an inner ring, an outer ring, a plurality of sprags positioned between the inner ring and the outer ring, and a spring biasing each of the plurality of sprags towards the outer ring. Each of the plurality of sprags includes an inner elongated corner adjacent the inner ring, an outer elongated corner in contact with the outer ring, and a center of gravity offset from the outer elongated corner. Each of the plurality of sprags are movable between a disengaged position with the inner elongated corner spaced from the inner ring and an engaged position with the inner elongated corner contacting the inner ring and the outer elongated corner contacting the outer ring such that in the engaged position, the plurality of sprags rotationally unitize the inner ring and the outer ring.

Embodiments described herein provide an aircraft comprising an airframe, a main power unit configured to generate first power, an auxiliary power unit configured to generate second power, a rotor assembly configured to generate at least one of lift and thrust. The aircraft further comprises a gearbox configured to be coupled to the rotor assembly. The gearbox is selectively coupled to the main power unit by a main freewheel unit and the gearbox is selectively coupled to the auxiliary power unit by an auxiliary freewheel unit. The auxiliary freewheel unit comprises an inner ring selectively coupled to the auxiliary power unit, an outer ring selectively coupled to the main power unit, and a plurality of sprags, each of the plurality of sprags being movable between a disengaged position spaced from the inner ring and an engaged position contacting both the inner ring and the outer ring to rotationally unitize the inner ring and the outer ring such that the first power and the second power are each applied to the rotor assembly.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
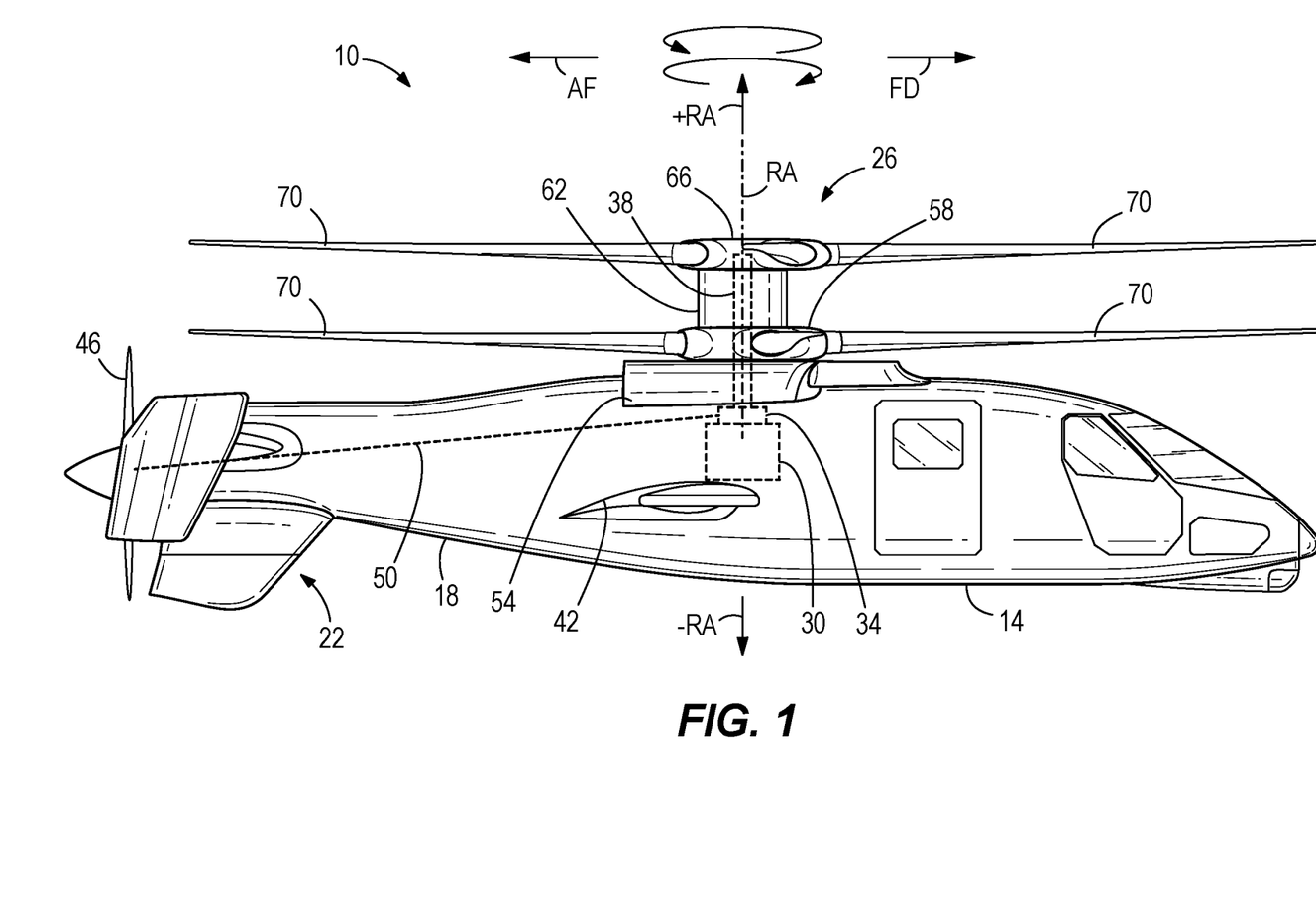
FIG. 1 depicts a schematic of a rotary wing aircraft according to an exemplary embodiment.

FIG. 1 depicts an exemplary embodiment of a rotary wing, vertical takeoff and land (VTOL) aircraft 10. The aircraft 10 includes an airframe 14 having a body 18 and a tail 22. The tail 22 extends from the body 18. A dual, counter rotating, coaxial main rotor assembly 26 is coupled to the body 18 of the airframe 14. As will be described in detail below, the main rotor assembly 26 rotates about a rotational axis RA. The rotor assembly 26 may be used in other types of aircraft 10 such as non-vertical takeoff and land (non- VTOL) aircraft 10. For example, the rotor assembly 26 may be used in single main rotor helicopters, tandem rotor helicopters including offset rotor assemblies, tandem intermeshing rotor helicopters including overlapping rotor assemblies, coaxal helicopters including a plurality of rotary wings aligned along a common axis, and the like. The rotor assembly 26 may also be used for other transport vehicles such as automobiles, boats and the like. The rotor assembly 26 may also be used in other contexts (e.g., motors) not relating to transport vehicles.

In an exemplary embodiment (the VTOL aircraft 10 of FIG. 1), the airframe 14 includes two seats for flight crew (e.g., pilot and co-pilot) and six seats for passengers. However, an airframe 14 having another configuration (e.g., single seat airframes, airframes configured for transporting both flight crew and passengers) is within the scope of the present disclosure. The main rotor assembly 26 is driven by a power source 30. The power source 30 may be, for example, one or more engines. The power source 30 may transmit on-board electrical energy (e.g., from a battery or other electrical energy source) or chemical energy (e.g., from fuel or another chemical energy source) into mechanical energy (i.e., torque).

The power source 30 is capable of transmitting energy to the main rotor assembly 26. The power source 30 is coupled to the main rotor assembly 26 via a gearbox 34 and a drive shaft 38. The power source 30 is coupled to the gearbox 34, and the gearbox 34 is coupled to the drive shaft 38, which is coupled to the rotor assembly 26. As illustrated in FIGS. 6-9, the power source 30 includes a main power unit (MPU) 30a and an auxiliary power unit (APU) 30b. Upon activation of the power source 30, the power source 30 generates power that is transmitted to the rotor assembly 26 through the gearbox 34 and the drive shaft 38. Accordingly, the rotor assembly 26 can utilize the mechanical energy generated by the power source 30 to generate at least one of thrust and lift forces to counteract and/or overcome drag and weight forces acting upon the aircraft 10. Accordingly, the aircraft 10 can hover in place or be maneuvered to a desired position.

In some embodiments, the aircraft 10 may include a wing 42 in addition to the rotor assembly 26 and an auxiliary propeller 46. The illustrated wing 42 includes a cross-sectional profile in the shape of an airfoil. The airfoil shape, size, and length of the wing 42 may be selected to optimize flight of the aircraft 10. The illustrated auxiliary propeller 46 is positioned on the tail 22 and is spaced from the body 18. The auxiliary propeller 46 may be coupled to the gearbox 34. In other embodiments, the auxiliary propeller 46 may be coupled to a dedicated power source and a dedicated gearbox. The illustrated auxiliary propeller 46 is coupled to the gearbox 34 via an auxiliary drive shaft 50. The power source 30 may simultaneously provide power (e.g., mechanical energy) to the rotor assembly 26 and the auxiliary propeller 46 via the gearbox 34. In other modes of operation (e.g., while hovering in place), the gearbox 34 may drive only one of the rotor assembly 26 and the auxiliary propeller 46.

With continued reference to FIG. 1, the rotor assembly 26 includes a pylon fairing 54, a lower hub fairing 58 (e.g., a first hub fairing), a shaft fairing 62, and an upper hub fairing 66 (e.g., a second hub fairing). In the illustrated embodiment, each of the lower hub fairing 58 and the upper hub fairing 66 includes a plurality of blades 70 coupled thereto. The lower hub fairing 58 and the upper hub fairing 66 may each be coupled to the drive shaft 38 for rotation therewith upon excitation of the power source 30. The lower hub fairing 58 and the upper hub fairing 66 are each aligned along the rotational axis RA, and are each configured to rotate about the rotational axis RA. The size (e.g., diameter), shape (e.g., pitch, airfoil), and quantity of blades 70 coupled to each hub fairing 58, 66 may be selected to optimize flight of the aircraft 10. Depending on the orientation (i.e., roll, pitch, yaw) of the aircraft 10 during flight and speed of rotation about the rotational axis RA, the blades 70 may generate varying combinations of lift (in an upward direction +RA) and thrust (in a forward direction FD) to control flight of the aircraft 10.

In the illustrated embodiment, the blades 70 are connected to the rotor assembly 26 in a hingeless manner, also referred to as a rigid rotor system. The illustrated rotor assembly 26 is a coaxially stacked system having a plurality of blades 70 coupled to the lower hub fairing 58 and a plurality of blades 70 coupled to the upper hub fairing 66. The lower hub fairing 58 and the upper hub fairing 66 are coaxial with the rotational axis RA. A particular aircraft 10 or rotor assembly 26 may be otherwise configured. For example, other rotary-wing aircraft such as aircrafts 10 including non-coaxial rotor blades 70 are possible.

In some embodiments, the upper hub fairing 66 may be driven in a first direction (e.g., clockwise) about the rotational axis RA, and the lower hub fairing 58 may be driven in an opposite second direction (e.g., counter-clockwise) about the rotational axis RA. In other words, the lower hub fairing 58 and the upper hub fairing 66 may be counter-rotating.

Figure 2:
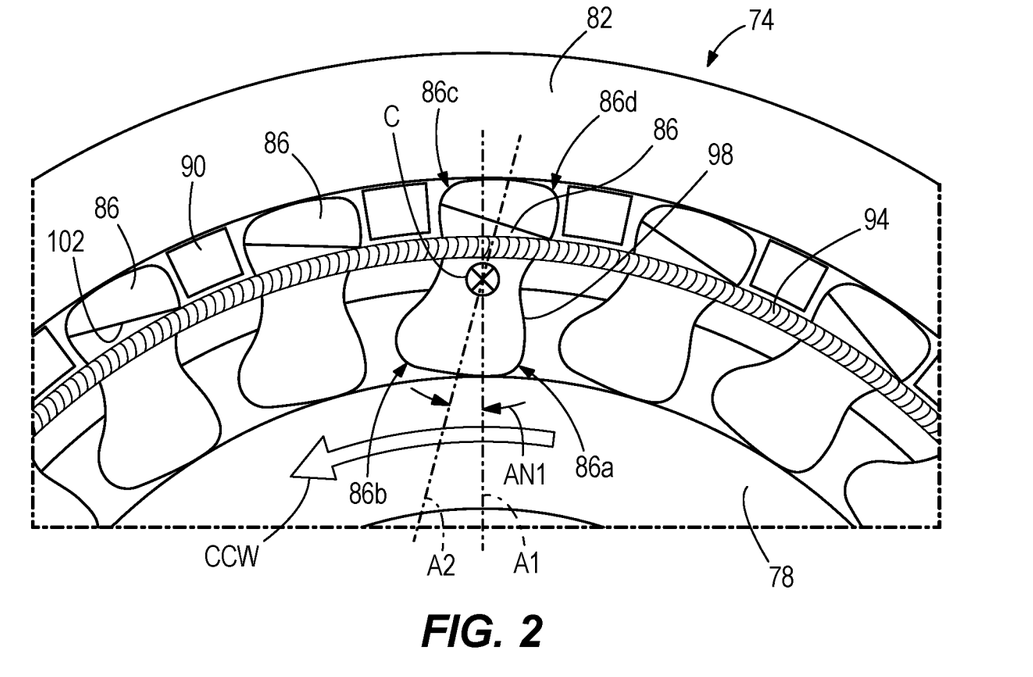
FIG. 2 depicts a freewheel clutch in an overrun position.

FIG. 2 depicts a main freewheel unit (MFU) 74 of the aircraft 10, which selectively connects the main power unit (MPU) 30a to the gearbox 34. The main freewheel unit (MFU) 74 is further illustrated in FIGS. 6-9. The main freewheel unit (MFU) 74 includes an inner ring 78, an outer ring 82, and a plurality of sprags 86 positioned between the inner ring 78 and the outer ring 82. The MFU 74 includes a spacer 90 configured to circumferentially space the sprags 86 about the inner ring 78 and outer ring 82. The illustrated spacer 90 spaces the sprags 86 evenly circumferentially between the inner ring 78 and outer ring 82. Other spacers 90 may provide different spacing of the sprags 86. The sprags 86 provide a highly redundant and safe mechanism to transmit force between the inner ring 78 and the outer ring 82. By providing a plurality of sprags 86 (e.g., mechanically in parallel between the inner ring 78 and the outer ring 82), if any one sprag 86 includes wear or is otherwise damaged, the remaining sprags 86 may continue to operate as intended to wedge between and transmit force between inner ring 78 and outer ring 82. The MFU 74 further includes a spring 94 that biases each of the plurality of sprags 86 towards the outer ring 82.

Each of the sprags 86 are dimensioned as cam-shaped wedges. FIG. 2 depicts a cross-sectional view through the sprags 86. An outer profile 98 of each sprag 86 includes an inner shortened corner 86a, an inner elongated corner 86b, an outer shortened corner 86c, and an outer elongated corner 86d. The sprags 86 are generally divided into quadrants represented by each corner 86a-86d. Each corner 86a-86d is rounded to interface with the corresponding inner ring 78 or outer ring 82. The descriptors of each corner 86a-86d relate to a distance from each corner 86a-86d to a geometric center C of each sprag 86, and the position of the corner 86a-86d relative to the inner ring 78 and outer ring 82. For example, the inner shortened corner 86a is closer to the inner ring 78 than the outer ring 82, and the inner shortened corner 86a is closer to the geometric center C of the illustrated sprag 86 when compared to the inner elongated corner 86b. In the illustrated embodiment, the inner shortened corner 86a and the outer shortened corner 86c are positioned on opposite circumferential sides of the geometric center C. Similarly, the inner elongated corner 86b and the outer elongated corner 86d are positioned on opposite circumferential sides of the geometric center C. In the illustrated embodiment, each sprag 86 is generally hourglass shaped with a first portion of the outer profile 98 between the corners 86a, 86d and a second portion of the outer profile 98 between the corners 86b, 86c having reduced size relative to the remainder of the outer profile 98. However, the sprags 86 may include differing outer profiles 98 other than the described and illustrated profile.

Each of the sprags 86 further includes a spring contact surface 102 configured to receive biasing force from the spring 94. In the illustrated embodiment, the spring contact surface 102 is positioned adjacent the outer corners 86c-86d, and the spring 94 biases each sprag 86 outwardly towards the outer ring 82. However, other arrangements are possible.

FIG. 2 depicts the main freewheel unit (MFU) 74 in a disengaged position where the inner ring 78 rotates in a first direction (e.g., counterclockwise direction CCW, as depicted in FIG. 2), and the shortened corners 86a, 86c contact the inner ring 78 and the outer ring 82, respectively, to permit rotation of the inner ring 78 relative to the outer ring 82. The inner shortened corner 86a remains in contact with the inner ring 78 as the inner ring 78 rotates relative to the outer ring 82. Similarly, the outer shortened corner 86c remains in contact with the outer ring 82 as the inner ring 78 rotates relative to the outer ring 82.

An angle AN1 is provided between a reference axis A1 extending outwardly from a center of rotation of the rings 78, 82 passes through the geometric center C of the sprag 86, and a second reference axis A2 which bisects the sprag 86 (and generally separates the corners 86a, 86b from one another and the corners 86c, 86d from one another) and passes through its geometric center C. The angle AN1 may be between 1 degree and 20 degrees. In other embodiments, the angle AN1 may be between 5 and 15 degrees. In the illustrated embodiment, the angle AN1 is approximately 13 degrees. Other angles AN1 are possible.

Figure 3:
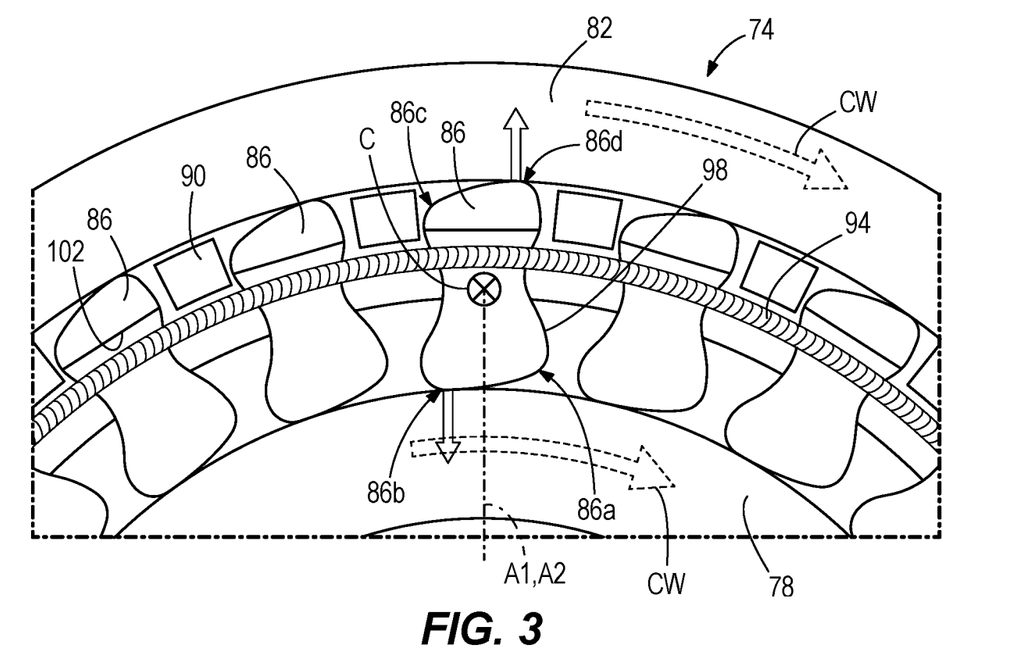
FIG. 3 depicts the freewheel clutch of FIG. 2 in an engaged position.

In contrast, FIG. 3 depicts the main freewheel unit (MFU) 74 in an engaged position where the inner ring 78 has been rotated in a second direction (e.g., clockwise direction CW, as depicted in FIG. 3) opposite the first direction. As the inner ring 78 rotates in this direction, each sprag 86 is rotated about its geometric center C or another rotation point such that the angle AN1 is reduced to approximately zero, or enough to wedge the elongated corners 86b, 86d between the inner ring 78 and the outer ring 82. In this position, the inner ring 78 and the outer ring 82 are rotationally unitized such that rotation of the inner ring 78 in the second direction (e.g., clockwise direction CW) carries the outer ring 82 for rotation in the second direction (e.g., the clockwise direction CW).

Figure 7:
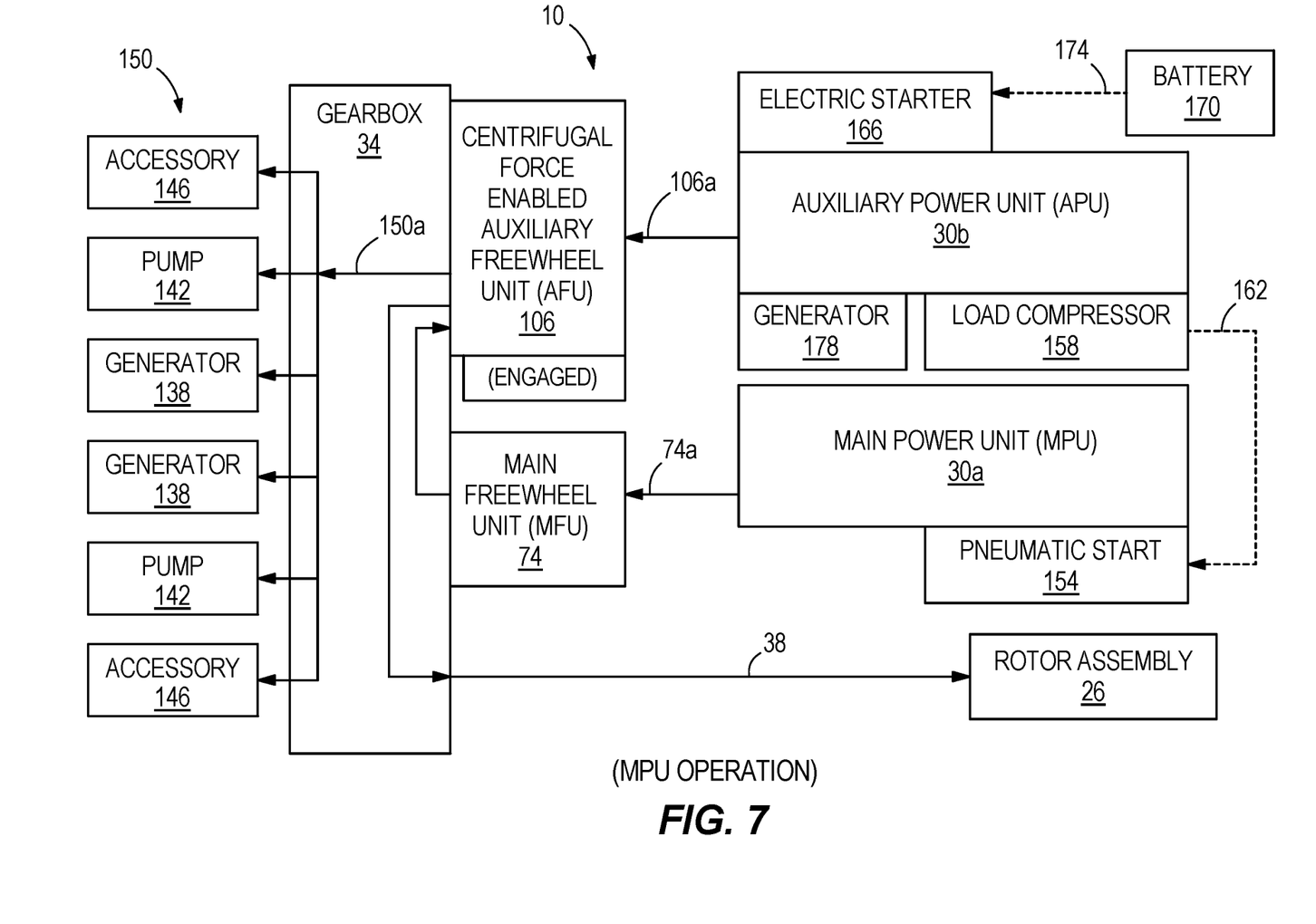
FIG. 7 depicts a schematic diagram of the rotary wing aircraft of FIG. 1 including the freewheel clutch of FIG. 4 in a main power unit operation.

The main freewheel unit (MFU) 74 generally functions similar to known clutches. Such clutches are known as sprag clutches, one-way bearings, freewheel clutches, cam clutches, overrunning clutches, and the like. In the engaged position, such clutches spread loads that unitize the inner ring 78 to the outer ring 82 generally evenly between each of the plurality of sprags 86. As depicted in FIG. 7, the main freewheel unit (MFU) 74 is configured to couple the main power unit (MPU) 30a to the gearbox 34.

Figure 4:
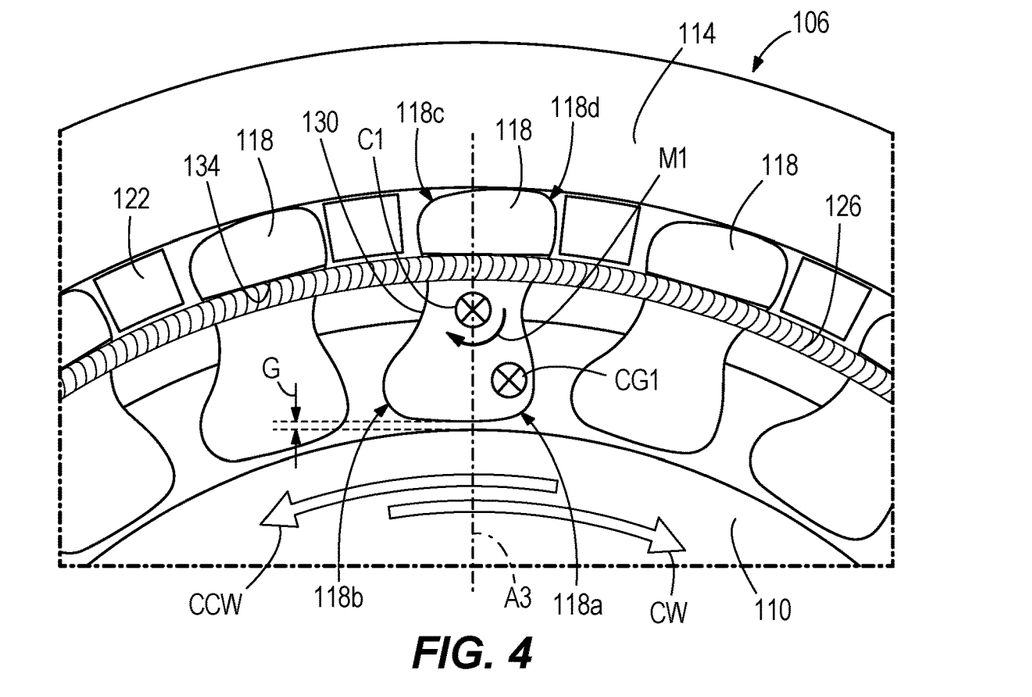
FIG. 4 depicts a centrifugal force enabled freewheel clutch in a disengaged position in which a sprag is spaced from an inner ring.

FIG. 4 depicts an auxiliary freewheel unit (AFU) 106 of the aircraft 10 which selectively connects the auxiliary power unit (APU) 30b to the gearbox 34. The auxiliary freewheel unit (AFU) 106 is further illustrated in FIGS. 6-9. Similar to the main freewheel unit (MFU) 74, the auxiliary freewheel unit (AFU) 106 includes an inner ring 110, an outer ring 114, and a plurality of sprags 118 positioned between the inner ring 110 and the outer ring 114. The AFU 106 includes a spacer 122 configured to circumferentially space the sprags 118 about the inner ring 110 and outer ring 114. The illustrated spacer 122 spaces the sprags 118 evenly circumferentially between the inner ring 110 and the outer ring 114. Other spacers 122 may provide different spacing of the sprags 118. The AFU 106 further includes a spring 126 that biases each of the plurality of sprags 118 towards the outer ring 114.

In the illustrated embodiment, each of the sprags 118 includes an outer profile 130 having similar geometrically dimensioned corners 118a-118d (e.g., an inner shortened corner 118a, an inner elongated corner 118b, an outer shortened corner 118c, and an outer elongated corner 118d) as described above with regard to the sprags 86 of the MFU 74. However, the sprags 118 each include a geometric center C1 and a center of gravity CG1 offset from the geometric center C1. Each of the sprags 118 also includes a spring contact surface 134 configured to receive biasing force from the spring 126. In the illustrated embodiment, the spring contact surface 134 is positioned adjacent the outer corners 118c-118d, and the spring 126 biases each sprag 118 outwardly towards the outer ring 114. However, other arrangements are possible.

FIG. 4 depicts the auxiliary freewheel unit (AFU) 106 in a disengaged (e.g., spaced) position where the sprags 118 are spaced by a radially extending gap G from contacting the inner ring 110. In this position, the inner ring 110 is free to rotate in either a first direction (e.g., counterclockwise direction CCW, as depicted in FIG. 4) or an opposite second direction (e.g., clockwise direction CW, as depicted in FIG. 4). More specifically, the gap G extends between the inner ring 110 and the inner corners 118a, 118b of the sprags 118. In the disengaged position, a reference axis A3 extending outwardly from a center of rotation of the rings 110, 114 passes through a geometric center C1 of the sprag 118.

Figure 5:
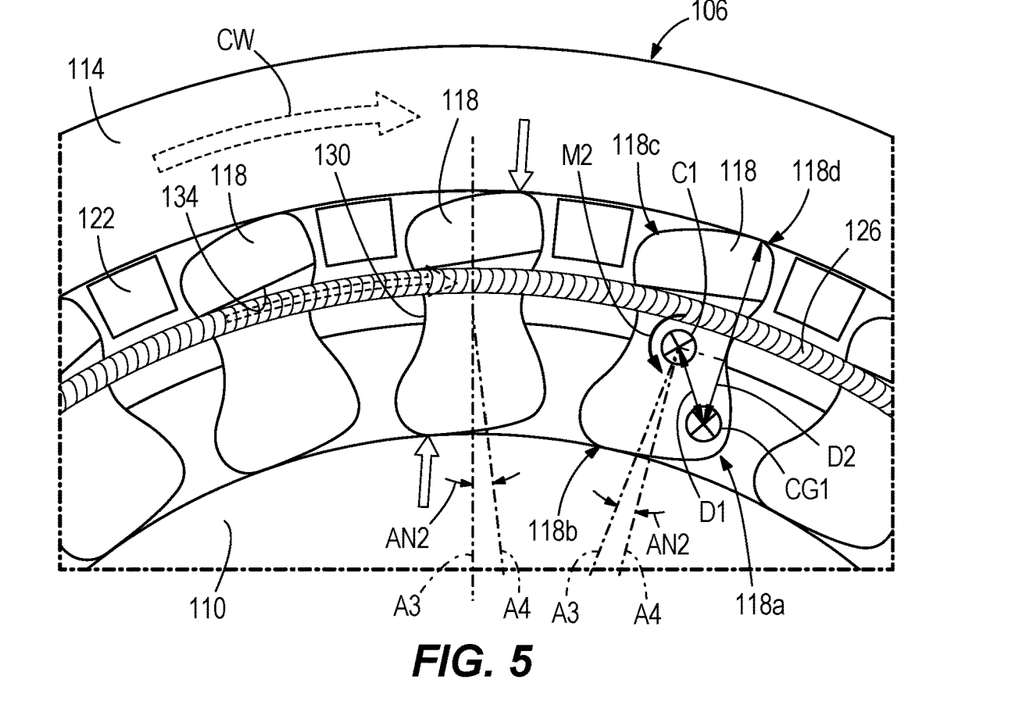
FIG. 5 depicts the centrifugal force enabled freewheel clutch of FIG. 4 in an engaged position in which the sprag contacts the inner ring.

Once the outer ring 114 is rotated a sufficient amount in a clockwise direction CW as illustrated in FIG. 5, the auxiliary freewheel unit (AFU) 106 is transitioned to an engaged (e.g., contacting) position where the sprags 118 contact and wedge between the inner ring 110 and outer ring 114. During this transition, the spring 126 may also press against the spring contact surfaces 134 of the sprags 118. During the transition, the sprags 118 are rotated about their geometric centers C1—as illustrated by the counter-clockwise moment arrow M2 in FIG. 5. The sprags 118 are rotated such that they are oriented along a perturbed reference axis A4 provided at an angle AN2 from their original reference axis A3. The angle AN2 may be between 1 degree and 20 degrees. In other embodiments, the angle AN2 may be between 5 and 15 degrees. In the illustrated embodiment, the angle AN2 is approximately 10 degrees. Other angles AN2 are possible.

Once in this engaged position (FIG. 5), the inner elongated corners 118b of the sprags 118 contact the inner ring 110 and the outer elongated corners 118d contact the outer ring 114 to wedge the sprags 118 between the inner ring 110 and the outer ring 114, and thereby rotationally unitize the inner ring 110 with the outer ring 114. Subsequent clockwise rotation of the inner ring 110 will be transmitted through the wedged sprags 118 and result in corresponding clockwise rotation of the outer ring 114. In the illustrated embodiment, torque can only be transmitted from the inner ring 110 to the outer ring 114 in the clockwise direction.

As illustrated in FIG. 5, each of the sprags 118 has a center of gravity CG1 that is offset from both the geometric center C1 of the sprag 118 and the outer elongated corner 118d of the sprag 118. The center of gravity CG1 is offset from the geometric center C1 by a distance D1. The center of gravity is offset from the outer elongated corner 118d by a distance D2. In the illustrated embodiment, the center of gravity CG1 is positioned within the bounds of the outer profile 130 generally adjacent the inner shortened corner 118a. However, any position of the center of gravity CG1 may be possible. The offset center of gravity CG1 is configured to return each of the plurality of sprags 118 to their disengaged position (FIG. 4) upon a threshold decrease of rotational speed of the outer ring 114 in the first direction (e.g., clockwise direction CW).

The shape of the outer profile 130 and an amount of offset (e.g., the distance D2) between the center of gravity CG1 and the outer elongated corner 118d may be selected such that each of the plurality of sprags 118 are transitioned from the engaged position to the disengaged position upon a threshold difference of rotational speed between the inner ring 110 and the outer ring 114. The threshold difference of rotational speed may be equal to between 15 percent and 20 percent. For example, if the inner ring 110 is rotating at a given speed, and the rotational speed of the outer ring 114 drops below approximately 80-85% of the given speed, the offset center of gravity CG1 may cause the sprags 118 to return to the disengaged position to permit rotation of the inner ring 110 relative to the outer ring 114 without the inertia of the outer ring 114 slowing the inner ring 110.

The sprags 118 are configured to mechanically return to the disengaged position (FIG. 4) upon reaching the threshold difference of rotational speed. During this disengagement, the sprags 118 are rotated about a counter clockwise moment arrow M1 to reorient the sprags 118 from their perturbed orientation along the perturbed reference axis A4 to their original reference axis A3. During the disengagement, the angle AN2 is taken up, and the gap G is reformed. The auxiliary freewheel unit (AFU) 106 may freely transition between the disengaged position (FIG. 4) and the engaged position (FIG. 5) based on rotary speeds of the inner ring 110 and the outer ring 114.

In some embodiments, the auxiliary freewheel unit (AFU) 106 (e.g., having an outer profile 130 and center of gravity CG1 corresponding with an 80-85% threshold) may be removable from the gearbox 34 and replaceable with another auxiliary freewheel unit (AFU) (not shown) having a different outer profile 130 and center of gravity CG1 to provide different threshold difference (e.g., a 70-75% threshold). As such, the auxiliary freewheel unit (AFU) 106 may provide an adjustable on/off operational point.

Additionally, the outer profile 130 of the sprags 118 may be configured to permit overrunning of the outer ring 114 relative to the inner ring 110. Overrunning may occur when the rotary speed of the outer ring 114 exceeds the rotary speed of the inner ring 110 and a wedging force of the sprags 118. This may occur during some motive maneuvers of the aircraft 10. After overrunning of the outer ring 114 and upon return to meeting the rotary speed of the inner ring 110, the sprags 118 may once again rotationally unitize the outer ring 114 to the inner ring 110.

The aircraft 10 further optionally includes a number of other mechanisms used throughout operation thereof. For example, the aircraft 10 may include any number of generators 138, pumps 142, and accessories 146 that require input power. The generators 138, pumps 142, and accessories 146 may be referred to as a powered tool 150 (or plurality of powered tools 150). The main power unit (MPU) 30a may include a pneumatic start 154. The pneumatic start 154 may be coupled to a load compressor 158 of the auxiliary power unit (APU) 30b by a pneumatic line 162. The auxiliary power unit (APU) 30b includes an electric starter 166 coupled with a battery 170 by an electric line 174. The auxiliary power unit (APU) 30b may further include an on-board generator 178. The main power unit (MPU) 30a is connected to the main freewheel unit (MFU) 74 as illustrated diagrammatically by a main freewheel line 74a. The auxiliary power unit (APU) 30b is connected to the auxiliary freewheel unit (AFU) 106 as illustrated diagrammatically by an auxiliary freewheel line 106a. A power tool line 150a may connect at least one of the main freewheel unit (MFU) 74 and the auxiliary freewheel unit (AFU) 106 to at least one of the powered tools 150.

Throughout operation of the aircraft 10, it may be advantageous to operate one of or both of the main power unit (MPU) 30a and the auxiliary power unit (APU) 30b. Upon startup of the aircraft 10, it may be advantageous to operate only the auxiliary power unit (APU) 30b to save power and operate in a quiet manner. During takeoff and/or flight of the aircraft 10, it may be advantageous to operate both the main power unit (MPU) 30a and the auxiliary power unit (APU) 30b with both the main power unit (MPU) 30a and the auxiliary power unit (APU) 30b providing torque to the rotor assembly 26 to generate lift and thrust force. During failure of either the main power unit (MPU) 30a or the auxiliary power unit (APU) 30b, it may be advantageous to operate the other of the main power unit (MPU) 30a and the auxiliary power unit (APU) 30b to maintain full operation of the aircraft 10. Each of these operating conditions are permitted by inclusion of the centrifugal force enabled auxiliary freewheel unit (AFU) 106 described above. Notably, the auxiliary freewheel unit (AFU) 106 permits shifting between these operation modes in a mechanical manner without need for an electrical and/or hydraulic control system.

Figure 6:
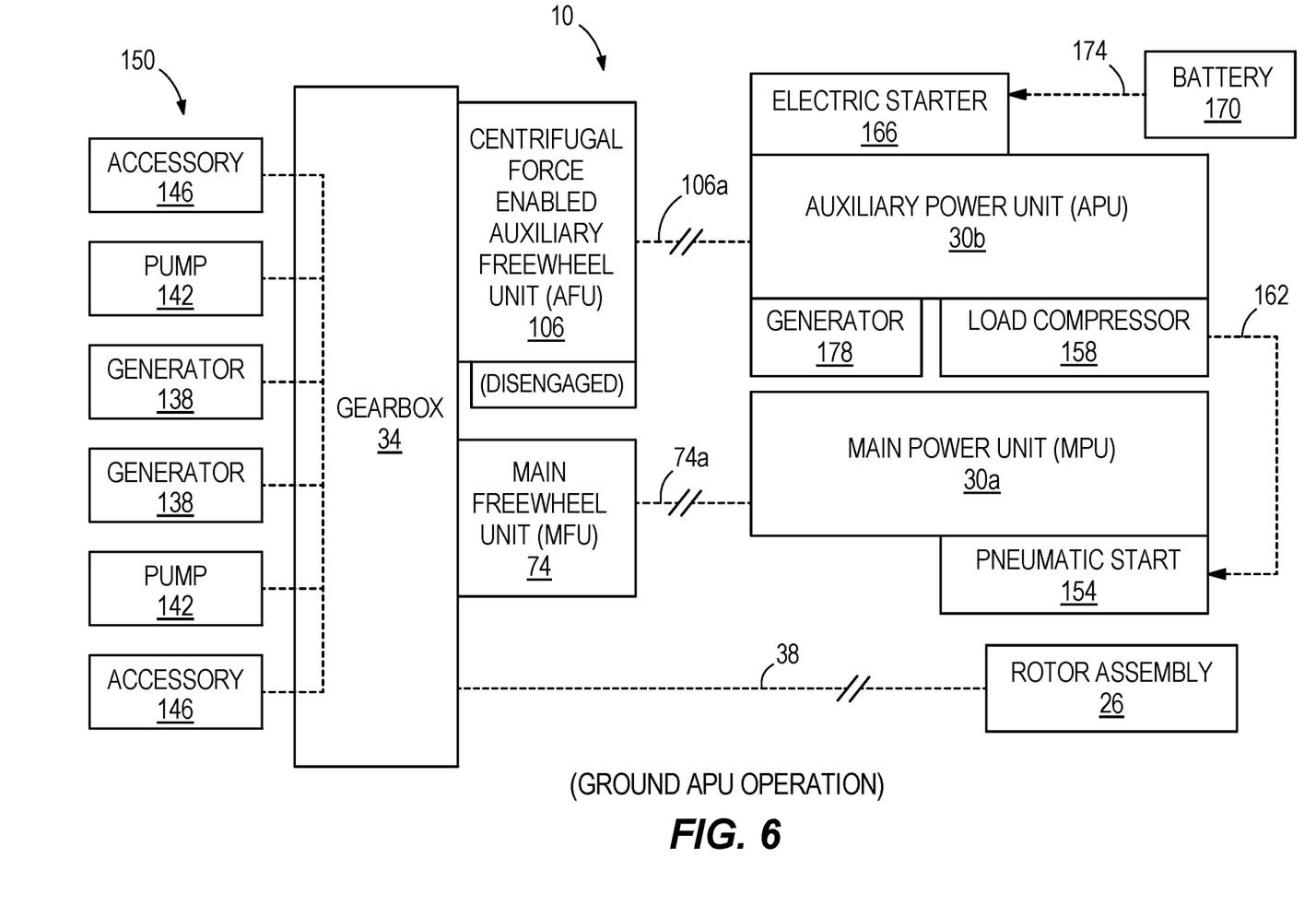
FIG. 6 depicts a schematic diagram of the rotary wing aircraft of FIG. 1 including the freewheel clutch of FIG. 4 in a ground operation.

FIG. 6 illustrates ground operation of the auxiliary power unit (APU) 30b. In this configuration, the main freewheel unit (MFU) 74 and the auxiliary freewheel unit (AFU) 106 are disengaged from the gearbox 34, as noted by the broken main freewheel line 74a and the broken auxiliary freewheel line 106a. The auxiliary power unit (APU) 30b is isolated from the gearbox 34, and may operate without transmitting torque to the gearbox 34. Upon startup of the aircraft 10 in the ground operation configuration, the battery 170 may pass or be instructed to pass electric power via the electric line 174. The electric starter 166 may start operation of the auxiliary power plant 30b for operation of the generator 178.

In ground operation condition (FIG. 6), the outer ring 114 of the auxiliary freewheel unit (AFU) 106 is stationary (FIG. 4), and the gap G between the sprags 118 and the inner ring 110 is present such that the auxiliary freewheel unit (AFU) 106 does not transmit torque to the gearbox 34. When desired to initiate startup of the main power unit (MPU) 30a, the auxiliary power unit (APU) 30b may operate the load compressor 158 and to provide pneumatic power via the pneumatic line 162 to the pneumatic start 154 of the main power unit 30a.

FIG. 7 illustrates takeoff and/or flight operation of the aircraft 10. During takeoff and/or flight of the aircraft 10, the main power unit (MPU) 30a provides input power to the gearbox 34 (as annotated by the solid main freewheel line 74a of FIG. 7), and the auxiliary power unit (APU) 30b may provide supplemental input power to the gearbox 34. The supplemental input power from the auxiliary power unit (APU) 30*b* may passed through the powered tool line 150*a* to power at least one of the powered tools 150. The auxiliary power unit (APU) 30*b* also provides input power to supplement the main power unit (MPU) 30*a* in driving the drive shaft 38 and rotor assembly 26.

In takeoff and/or flight operation conditions (FIG. 7), the outer ring 114 is perturbed (e.g., driven, for example, by operation of the main freewheel unit 74) in the clockwise direction CW (e.g., by the auxiliary power unit 30*b*) to its engaged position (FIG. 5). Due to the geometry and pivoting (e.g., perturbation) of the sprags 118, the sprags 118 take up the gap G in the engaged position (FIG. 5) to permit torque passage from the inner ring 110 to the outer ring 114. During takeoff and/or flight operation, torque is transmitted from the main power unit (MPU) 30*a* and the auxiliary power unit (APU) 30*b* to the gearbox 34.

Figure 8:
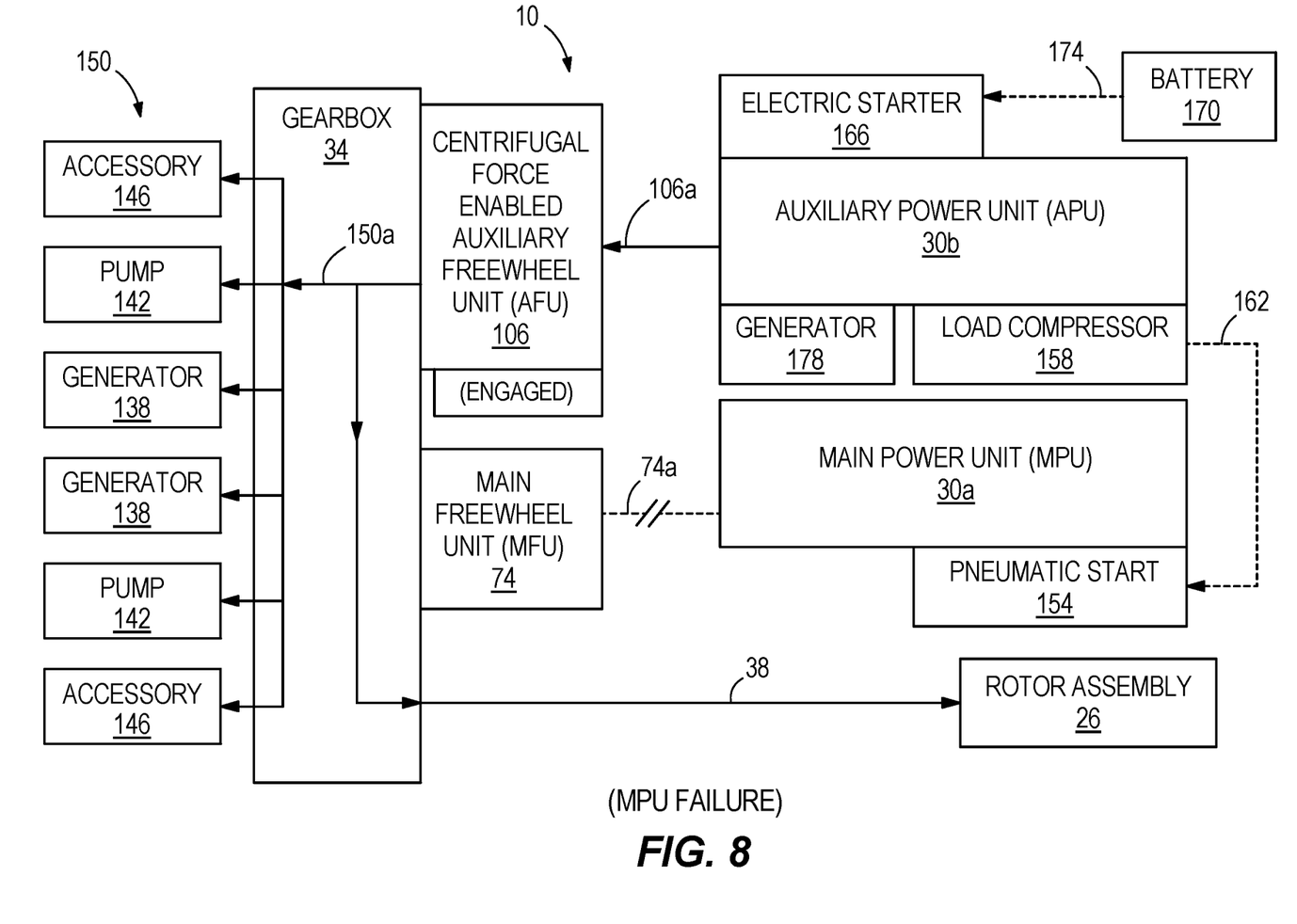
FIG. 8 depicts a schematic diagram of the rotary wing aircraft of FIG. 1 including the freewheel clutch of FIG. 4 in a main power unit failure operation.

FIG. 8 illustrates a failure condition of the main power unit (MPU) 30*a*. In this condition, a decrease in rotational speed of the main power unit (MPU) 30*a* will result in the main freewheel unit (MFU) mechanically disengaging the main power unit (MPU) 30*a* from the gearbox 34. The decrease in rotational speed of the main power unit (MPU) 30*a* will also result in the auxiliary freewheel unit (AFU) 106 being engaged to mechanically couple the auxiliary power unit (APU) 30*b* to the rotor assembly 26. Input power is transmitted from the auxiliary power unit (APU) 30*b* via the auxiliary freewheel unit (AFU) 106 to power rotation of the rotor assembly 26. While powering the rotor assembly 26, the auxiliary power unit (APU) 30*b* may also power the powered tools 150 via the powered tool line 150*a*.

In the failure condition of the main power unit (MPU) 30*a*, the auxiliary freewheel unit (AFU) 106 remains in its engaged position (FIG. 5). As long as sufficient rotation of the outer ring 114 in the clockwise direction CW (FIG. 5) is maintained, the auxiliary freewheel unit (AFU) 106 is maintained in its engaged position with the sprags 118 taking up the gap G and in position to transmit torque from the auxiliary power unit (APU) 30*b* to the gearbox 34. During failure condition of the main power unit (MPU) 30*a*, the auxiliary freewheel unit (AFU) 106 permits the auxiliary power unit (APU) 30*b* to power the gearbox 34.

Figure 9:
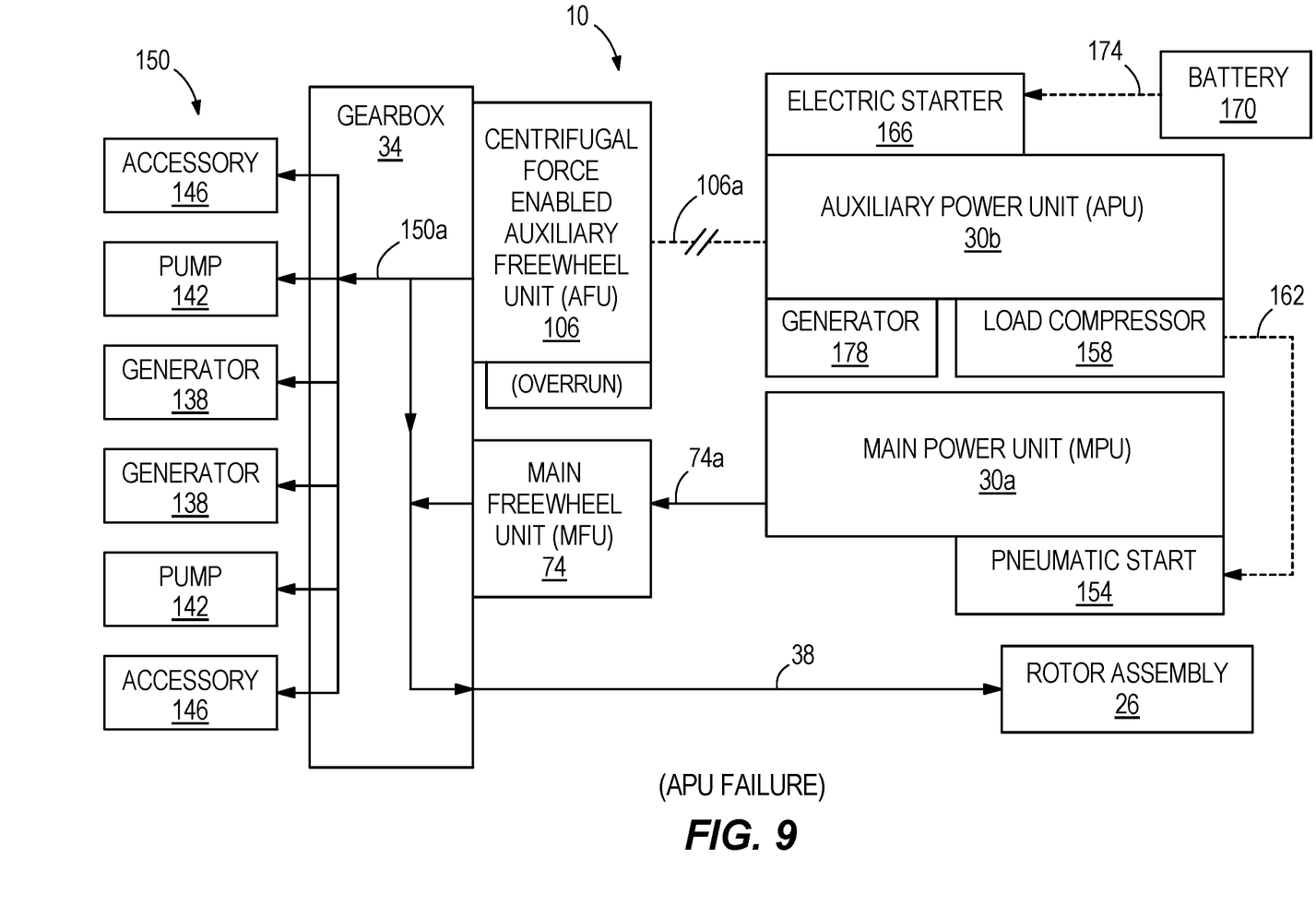
FIG. 9 depicts a schematic diagram of the rotary wing aircraft of FIG. 1 including the freewheel clutch of FIG. 4 in an auxiliary power unit failure operation.

FIG. 9 illustrates a failure condition of the auxiliary power unit (APU) 30*b*. In this condition, a decrease in rotational speed of the auxiliary power unit (APU) 30*b* will result in the outer ring 114 of the auxiliary freewheel unit (AFU) 106 overrunning the inner ring 110 of the auxiliary freewheel unit (AFU) 106. Due to the overrunning, the main power unit (MPU) 30*a* provides power to the powered tools 150 through the powered tool line 150*a*.

In the failure condition of the auxiliary power unit (APU) 30*b*, the auxiliary freewheel unit (AFU) 106 is operated in an overrunning condition where the outer ring 114 overruns (e.g., rotates at a faster rotational speed than) the inner ring 110. While the auxiliary freewheel unit (AFU) 106 operates in the overrunning condition, the sprags 118 are oriented along the perturbed reference axis A4 (e.g., as in the engaged position of FIG. 5), and the sprags 118 are configured to slip. Main freewheel unit (MFU) 74 transmits torque from the main power unit (MPU) 30*a* to power the gearbox 34 (e.g., including the powered tools 150 through the powered tool line 150*a* and/or the rotor assembly 26 through the drive shaft 38).

The centrifugal force enabled auxiliary freewheel unit (AFU) 106 and aircraft 10 (e.g., drive system) employing the auxiliary freewheel unit (AFU) 106 provide mechanical shifting means to mechanically and automatically (e.g., without requiring electrical or hydraulic control, such as, by an actuated clutch) provide input power to components (e.g., the powered tools 150, rotor assembly 26) thereof as necessary during startup, takeoff, regular use, and various failure conditions of the aircraft 10. The auxiliary freewheel unit (AFU) 106 permits a low cost, low weight, highly redundant and safe torque transmission between the auxiliary power unit (APU) 30*b* and the gearbox 34.

While embodiments disclosed herein primarily refer to a centrifugal force enabled auxiliary freewheel unit 106 for an aircraft, similar centrifugal force enabled freewheel units may be implemented in assemblies which are not aircraft. For example, land and/or water supported vehicles, or other non-vehicular apparatus may employ similar centrifugal force enabled freewheel units.

Various features and advantages of the embodiments described herein are set forth in the following claims.

What is claimed is:

1. A clutch comprising:
an inner ring;
an outer ring;
a plurality of sprags positioned between the inner ring and the outer ring; and
a spring biasing each of the plurality of sprags towards the outer ring;
wherein, according to the rotation of the outer ring and the bias of the spring, each of the plurality of sprags are movable between a disengaged position in which the sprags are spaced from the inner ring and the outer ring does not rotate with the inner ring, and an engaged position in which the sprags overcome the bias of the spring and the sprags contact both the inner ring and the outer ring such that the inner ring and the outer ring are rotationally unitized.

2. The clutch of claim 1, wherein each of the plurality of sprags includes an outer elongated corner in contact with the outer ring and a center of gravity offset from the outer elongated corner, the offset center of gravity being configured to return each of the plurality of sprags to the disengaged position.

3. The clutch of claim 2, wherein each of the plurality of sprags includes a contact surface having cross-sectional profile, the cross-sectional profile and an amount of offset of the center of gravity being selected such that each of the plurality of sprags are transitioned between the disengaged position and the engaged position upon a threshold difference of rotational speed between the inner ring and the outer ring.

4. The clutch of claim 3, wherein the threshold difference of rotational speed is equal to between 15 percent and 20 percent.

5. The clutch of claim 1, wherein the plurality of sprags are movable to the engaged position upon rotation of the outer ring in a first rotational direction.

6. The clutch of claim 1, wherein in the disengaged position, a gap extends between the plurality of sprags and the inner ring.

7. The clutch of claim 1, wherein in the disengaged position, the inner ring is rotatable in either a first rotational direction or an opposite second rotational direction relative to the outer ring.

8. The clutch of claim 1, wherein the outer ring is rotated along a first rotational direction to move the plurality of sprags from the disengaged position to the engaged position.

9. The clutch of claim 1, wherein once in the engaged position, rotation of the inner ring in the first rotational direction causes rotation of the outer ring in the first rotational direction.

10. A centrifugal force enabled clutch comprising:
an inner ring;
an outer ring;
a plurality of sprags positioned between the inner ring and the outer ring; and
a spring biasing each of the plurality of sprags towards the outer ring;
wherein each of the plurality of sprags includes an inner elongated corner adjacent the inner ring, an outer elongated corner in contact with the outer ring, and a center of gravity offset from the outer elongated corner;
wherein each of the plurality of sprags are movable between a disengaged position, with the inner elongated corner spaced from the inner ring, and an engaged position, with the inner elongated corner contacting the inner ring and the outer elongated corner contacting the outer ring such that in the engaged position, the plurality of sprags rotationally unitize the inner ring and the outer ring.

11. The centrifugal force enabled clutch of claim 10, wherein the plurality of sprags are movable to the engaged position upon rotation of the outer ring in a first rotational direction.

12. The centrifugal force enabled clutch of claim 10, wherein the offset center of gravity of each of the plurality of sprags is configured to return each of the plurality of sprags to the disengaged position.

13. The centrifugal force enabled clutch of claim 10, wherein each of the plurality of sprags includes a contact surface having cross-sectional profile, the cross-sectional profile and an amount of offset of the center of gravity being selected such that each of the plurality of sprags are transitioned between the disengaged position and the engaged position upon a threshold difference of rotational speed between the inner ring and the outer ring.

14. The centrifugal force enabled clutch of claim 13, wherein the threshold difference of rotational speed is between 15 percent and 20 percent.

* * * * *